United States Patent
Nagarkar et al.

(10) Patent No.: US 8,595,454 B1
(45) Date of Patent: Nov. 26, 2013

(54) SYSTEM AND METHOD FOR CACHING MAPPING INFORMATION FOR OFF-HOST BACKUPS

(75) Inventors: Kuldeep S. Nagarkar, Pune (IN); Ahish Govind Khurange, Pune (IN)

(73) Assignee: Symantec Corporation, Mountain View, CA (US)

( * ) Notice: Subject to any disclaimer, the term of this patent is extended or adjusted under 35 U.S.C. 154(b) by 219 days.

(21) Appl. No.: 12/872,056

(22) Filed: Aug. 31, 2010

(51) Int. Cl.
G06F 12/00 (2006.01)
G06F 13/00 (2006.01)
G06F 13/28 (2006.01)

(52) U.S. Cl.
USPC .......................................... 711/162

(58) Field of Classification Search
USPC .......................................... 711/162
See application file for complete search history.

(56) References Cited

U.S. PATENT DOCUMENTS

| 6,061,770 A * | 5/2000 | Franklin ........................ 711/162 |
| 7,398,366 B2 * | 7/2008 | Ohran et al. ................... 711/162 |
| 7,549,037 B1 * | 6/2009 | Kale et al. ..................... 711/218 |
| 2003/0149830 A1 * | 8/2003 | Torr et al. ..................... 711/100 |

* cited by examiner

*Primary Examiner* — Matthew Bradley
*Assistant Examiner* — Rocio Del Mar Perez-Velez
(74) *Attorney, Agent, or Firm* — Campbell Stephenson LLP

(57) ABSTRACT

Various systems and methods cache extent information for use in off-host backups. One method involves detecting that a first set of one or more blocks of client data has not been relocated subsequent to a prior off-host backup operation while also detecting that a second set of one or more blocks of the client data has been relocated subsequent to the prior off-host backup operation. In response to detecting that the first set has not been relocated, the method provides a media server with a previously calculated set of mapping information for the first set instead of recalculating that mapping information. In contrast, in response to detecting that the second set has been relocated subsequent to the prior off-host backup, the method recalculates mapping information for the second set. The media server is provided with the recalculated mapping information instead of previously calculated mapping information for the second set.

22 Claims, 4 Drawing Sheets

US 8,595,454 B1

SYSTEM AND METHOD FOR CACHING MAPPING INFORMATION FOR OFF-HOST BACKUPS

FIELD OF THE INVENTION

This invention relates to backups and, more particularly, to off-host backup operations.

DESCRIPTION OF THE RELATED ART

Traditionally, backing up data for a backup client requires the backup client to devote a significant amount of processing resources to the backup process. The backup process can also take a significant amount of time, during which the backup client may not be able to provide the services it normally provides to end users. In order to avoid these problems, off-host backups can be implemented. Off-host backups move a significant portion of the processing from the backup client to a media server and can reduce the amount of time that the backup client is required to participate in a given backup.

While off-host backups move a significant portion of the backup overhead away from the backup client, there is still some client processing involved in implementing off-host backups. Accordingly, improved techniques that further reduce the overhead incurred by backup clients during the backup process are desired.

SUMMARY OF THE INVENTION

Various systems and methods for caching extent information for use in off-host backups are disclosed. For example, one method involves detecting that a first set of one or more blocks of client data has not been relocated subsequent to a prior off-host backup operation while also detecting that a second set of one or more blocks of the client data has been relocated subsequent to the prior off-host backup operation. In response to detecting that the first set of one or more blocks has not been relocated, the method provides a media server with a previously calculated set of mapping information for the first set of one or more blocks instead of recalculating that mapping information. In contrast, in response to detecting that the second set of one or more blocks has been relocated subsequent to the prior off-host backup, the method recalculates mapping information for the second set of one or more blocks. The media server is provided with the recalculated mapping information instead of previously calculated mapping information for the second set of one or more blocks.

In one embodiment, detecting that the first set of one or more blocks has not been relocated can involve accessing file system geometry information associated with data in the first set of one or more blocks. Alternatively (or additionally), detecting that the first set of one or more blocks has not been relocated can involve obtaining a list of blocks that were modified subsequent to a first snapshot and prior to a second snapshot.

The method can also involve storing the recalculated mapping information for the second set of one or more blocks in a cache of mapping information. The cache can include the previously calculated set of mapping information for the first set of one or more blocks.

Providing the media server with the previously calculated set of mapping information can involve sending, to the media server via a network, a pointer to mapping information stored on a shared storage device. The media server can be provided with the previously calculated set of mapping information prior to the recalculating of the mapping information for the second set of one or more blocks.

An example of a system can include one or more processors and memory coupled to the one or more processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

Figure 1:
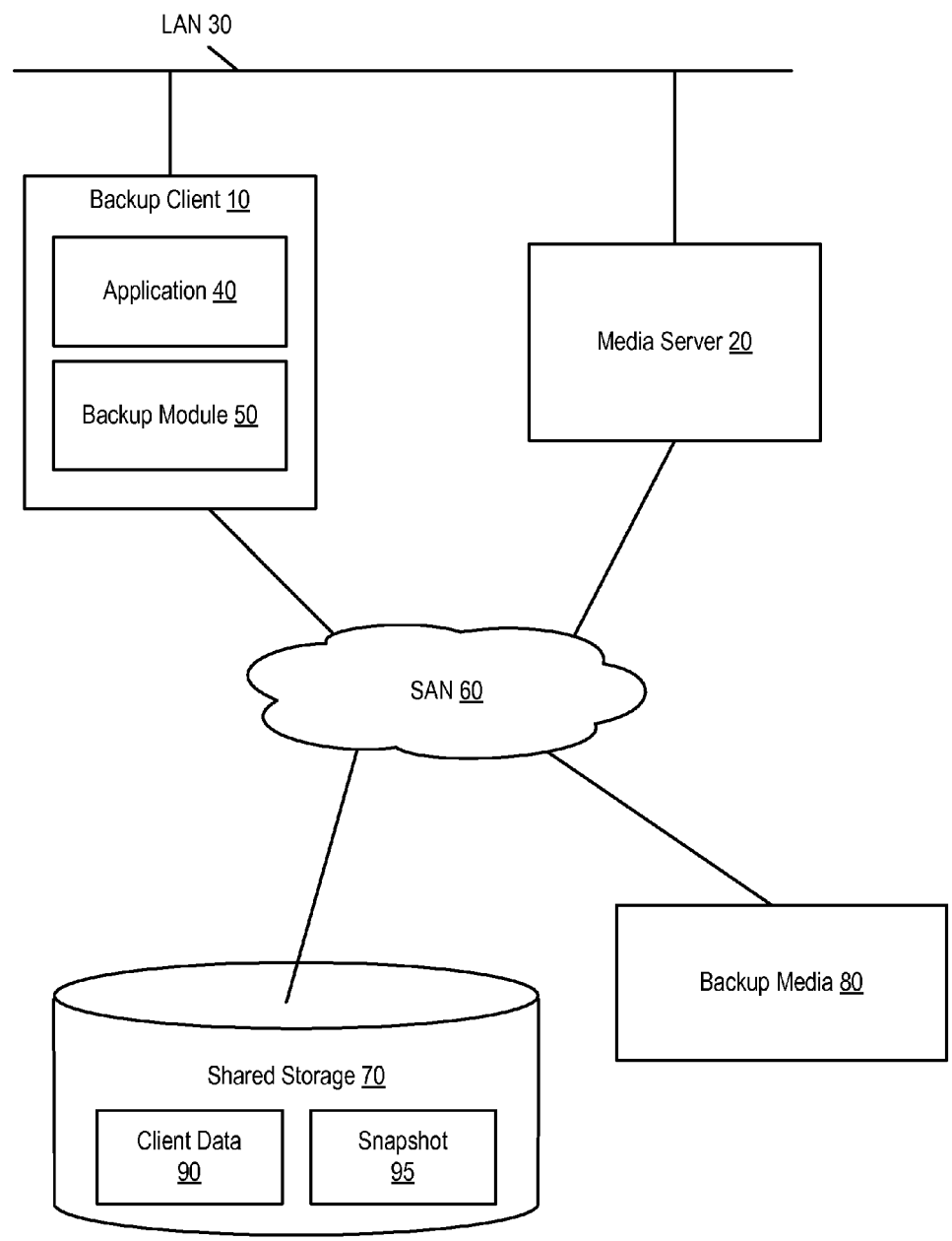
FIG. 1 is a block diagram of a system that in which a backup client caches mapping information for reuse in subsequent off-host backup operations, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a computing system. As shown, backup client 10 is coupled to media server 20 by local area network (LAN) 30 (other networks, including wide area networks (WANs) such as the Internet, can also be used instead of and/or in addition to LAN 30). Backup client 10 and media server 20 are each implemented from one or more computing devices, such as servers, personal computing devices, laptop computers, net books, personal digital assistants, cellular phones, or the like.

Backup client 10 is a client of a backup system that includes media server 20 (other components, which are not shown in this simplified example, such as backup servers can also be included in such a backup system). Backup client 10 executes an application 40 and a backup module 50, as discussed in more detail below.

Backup client 10 and media server 20 are coupled to access shared storage 70 via storage area network (SAN) 60 (other networks and/or interconnections may also be used instead of and/or in addition to SAN 60). Shared storage 70 can include one or more storage devices (e.g., hard drives, solid state drive (SSD) devices such as Flash drives, compact discs (CDs), digital versatile discs (DVDs), and the like. In some embodiments, shared storage can include one or more arrays of such devices, such as a just a bunch of disks (JBOD) array, redundant array of independent disks (RAID), or a jukebox of CDs or DVDs.

Media server 20 can also access backup media 80 via SAN 60 (or any other appropriate network and/or interconnection). Backup media 80 can be a storage device such as a tape drive, CD, DVD, hard drive, SSD device, or the like, or an array of such devices. In some embodiments, media server 20 is or includes a third party copy device. Such a third party copy device is a device, provided by a manufacturer other than the creator of the backup software being used, that is configured to copy data from one location to another.

Application 40 on backup client 10 processes (e.g., by generating and/or consuming to create, display, edit, execute, or otherwise process) client data 90 stored on shared storage 70. Application 40 can be any of a variety of different types of software programs, including programs that act as servers (e.g., database management systems, file servers, electronic mail servers, and the like) and programs that act as clients (e.g., email clients, web browsers, backup clients, and the like). Application 40 can alternatively be a stand-alone user-level program (e.g., a document processing application, a graphics editing program, a media player, or the like).

When a backup is requested (e.g., by an end user of backup client 10, by a backup server, by an automated request, or the like), backup module 50 causes a snapshot 95 of client data 90 to be generated. Snapshot 95 is a point-in-time image of client data 90, such that snapshot 95 presents a consistent image of the contents of client data 90 at a particular point in time. Typically, a snapshot can be created by temporarily suspending access to client data 90, such that client data 90 reaches a consistent state in which no modifications are currently in progress, and then creating the snapshot while client data is in that state. For example, application 40 can be quiesced (e.g., by putting the application in hot backup mode or volume snapshot (VSS) mode) and the file system buffers can be flushed to disk to put client data 90 in a stable, consistent state. Snapshot 95 can be generated using a variety of different techniques, such as mirror breakoff or minor splitting, copy on write (COW), redirect on write (ROW), or the like. After creation of the snapshot, normal operation can resume (e.g., by unquiescing the storage stack, and then unquiescing application 40).

Once snapshot 95 has been created, backup module 50 generates mapping information that maps the location of the data in snapshot 95 to an underlying storage device accessible to media server 20. This mapping information allows media server 20 to access snapshot 95 without necessarily having access to any of the tools (e.g., such as a file system, a volume manager, dynamic multipathing systems, and the like) that backup client 10 uses to organize client data 90 and snapshot 95 into logical structures. As such, the mapping information generated by backup module 50 can allow media server 20 to retrieve the data in snapshot 95 from shared storage 70 without media server 20 needing to be aware of the logical storage device(s) and/or structures into which client data 90 and the data in snapshot 95 are stored and/or organized.

The mapping information can identify each block (or a fixed- or variably-sized set of multiple blocks, which is referred to herein as an extent) of data within snapshot 95 and the location of that block in shared storage 70 in a manner that can be processed by media server 20 (e.g., by locating the block by reference to a disk sector). If identifying an extent, the mapping information can identify the location of the first block in the extent and, if the extent size can vary, either the number of blocks within the extent or the location of the final block in the extent. The mapping information can be calculated by translating the extents within files at, for example, the file system and volume manager layers in order to locate the extents within a raw partition.

Once the mapping information has been generated (or even as the mapping information is being generated), backup module 50 provides the mapping information to media server 20 via LAN 30. In response to receiving mapping information from backup module 50 via LAN 30, media server 20 can complete the backup operation by copying data from snapshot 95 (as located using the mapping information) to backup media 80. Once all of the data has been copied from snapshot 95 to backup media 80, the backup operation is complete.

After generating a set of mapping information as part of a backup operation, backup module 50 is configured to cache the mapping information. Backup module 50 can cache the mapping information by storing the mapping information locally within backup client 10 (e.g., by writing the mapping information to memory or to a local hard drive or SSD device within backup client 10) or by storing the mapping information within shared storage 70.

When subsequent backup operations are requested, backup module 50 can retrieve this cached mapping information. If a particular block or extent has not been relocated (i.e., has not changed locations on the underlying storage device to which that block or extent is being mapped), backup module 50 can simply send the cached mapping information for that block or extent to media server 20, without first needing to recalculate the mapping information. If instead the block or extent has been relocated (and thus its mapping has changed), backup module 50 will recalculate the mapping information for that block or extent, send the recalculated mapping information to media server 20, and replace the cached mapping information for that block or extent with the recalculated mapping information. A block or extent can be relocated in response to having being written (e.g., causing the location of the block to change within a copy on write snapshot), moved (e.g., as part of a defragmentation operation), or the like. Various techniques for detecting whether a block or extent has been relocated are described in more detail below.

If relatively few of the blocks or extents in the snapshot have been relocated since the last backup, backup module 50 will only need to recalculate a relatively small amount of mapping information, since the rest of the mapping information for the unrelocated blocks or extents will already be available in the cached set of mapping information. Accordingly, by using this technique, backup module 50 can reduce the amount of processing needed to be performed as part of the backup. This in turn can reduce the overhead needed for backup client 10 to participate in the backup operation, which can in turn provide desirable effects like reducing the size of a backup window, improving the performance of backup client 10, and the like.

Additionally, in some embodiments, backup module 50 can send the mapping information for the unrelocated blocks or extents to media server 20 prior to recalculating mapping information for all of (or even any of) the relocated blocks or extents. This allows media server 20 to begin copying the unrelocated blocks or extents as soon as the mapping information is received and before backup module 50 has finished recalculating the mapping information for the relocated blocks or extents.

As noted above, in some embodiments, backup module 50 can cache the mapping information on shared storage 70. In such embodiments, in order to further reduce traffic on LAN 30 (or any other network being used), backup module 50 can simply pass a pointer to the cached mapping information to media server 20 via LAN 30, instead of sending the entire set of cached mapping information to media server 20. If there are any relocated blocks or extents, backup module 50 can also send the recalculated extents for those relocated blocks or extents to media server 20 via LAN 30. Accordingly, if there are relatively few relocated blocks or extents, the traffic on LAN 30 can be significantly reduced.

Figure 2:
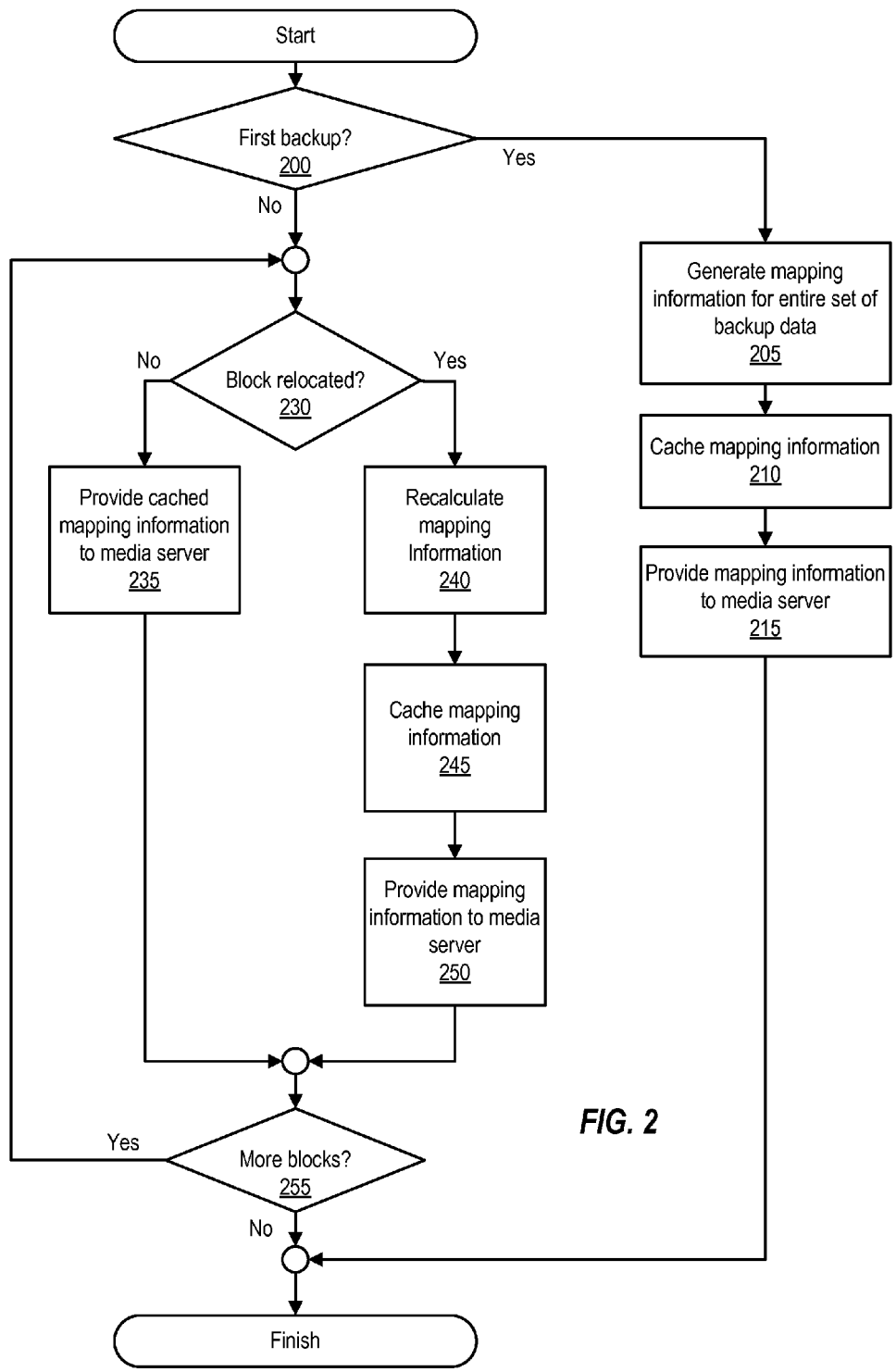
FIG. 2 is a flowchart of performing off-host backup operations that involves caching mapping information, according to embodiments of the present invention.

FIG. 2 is a flowchart illustrating how a backup module (e.g., backup module 50 of FIG. 1) executing on a backup client can participate in backup operations while caching mapping information for possible reuse. The method can be initiated in response to detecting a request to begin a backup operation. As noted above, such a request can be received from an end user or other computing device or application. Such requests can be generated on demand or according to prespecified schedules or conditions. For example, the backup system can be configured to perform a backup at midnight daily, or whenever a certain condition occurs.

The method begins at 200, when a determination is made as to whether the current backup operation is the first backup of the client data at issue. If so, the backup module will generate mapping information for the entire set of data to be backed up, as shown at 205. This can involve generating mapping information that identifies the location of each block within a snapshot on an underlying storage device. The backup module then caches this mapping information, as shown at 210, and provides the mapping information to a media server, as shown at 215. Providing the mapping information to the media server can involve directly transmitting the mapping information itself to the media server via a network or, alternatively, storing the mapping information on a shared storage device accessible to the media server and simply transmitting a pointer (e.g., a file name or address) to that mapping information to the media server via the network.

If the backup operation is not the first backup, as determined at 200 (e.g., by checking to see if mapping information has already been cached), the backup module then determines whether each block included in the backup (e.g., each block in a snapshot from which the media server will copy data to the backup media) has been relocated since the last backup, as shown at 230. Detecting whether a block (or an extent) has been relocated can involve comparing two snapshots (e.g., the current snapshot and the most recently created prior snapshot), accessing a list of blocks that have been modified prior to the last backup, and/or querying a file system for file geometry information, such as the number of blocks in a file, that indicates whether a file has been deleted, extended, or truncated.

If a block has not been relocated since the last backup, as detected at 230, the backup module simply provides the cached mapping information for that block to the media server, as indicated at 235. As noted above, providing this information can involve either sending the cached information via the network or, if the cached information is stored on a storage device accessible to the media server, sending a pointer to the cached information to the media server instead of sending the cached information itself.

If the block has been relocated, the backup module recalculates the mapping information for that block, as shown at 240. The backup module then caches this information (e.g., by overwriting previously calculated mapping information for the block in the cache with the newly recalculated information) and provides this mapping information to the media server, as shown at 245 and 250.

The method of FIG. 2 will continue until all blocks to be included in the backup have been processed, as indicated at 255. While the method of FIG. 2 shows the determination as to whether a set of one or more blocks has been changed being made on a block-by-block basis, other embodiments may make this determination in a different manner. For example, all of the relocated blocks can be determined at once by accessing a list of blocks that have been modified between two snapshots (one created at the point in time of the prior backup, another created at the point in time of the current backup). This list can be generated by enable change block tracking in a tool (e.g., a volume manager) that provides snapshot functionality. Alternatively, sets of several blocks or extents can be identified, at the same time, as having been relocated by querying a file system for file geometry to see if the file or any of its component extents have changed size or been moved since the last backup was generated.

Figure 3:
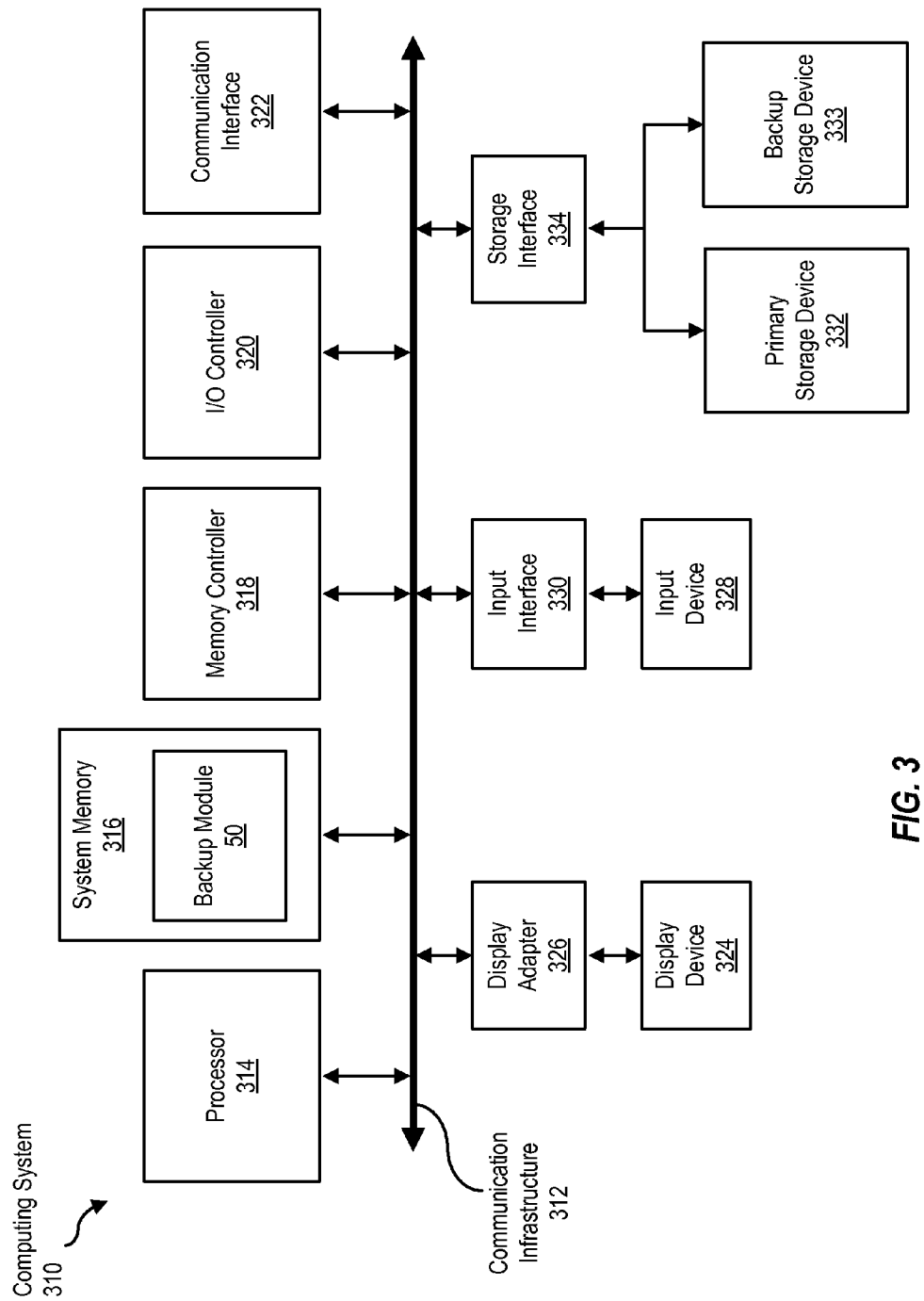
FIG. 3 is a block diagram of a computing device, illustrating how a backup module that caches mapping information for use in subsequent off-host backup operations can be implemented in software, according to one embodiment of the present invention.

FIG. 3 is a block diagram of a computing system 310 (e.g., a backup client like backup client 10 of FIG. 1) capable of implementing a backup module as described above. Computing system 310 broadly represents any single or multi-processor computing device or system capable of executing computer-readable instructions. Examples of computing system 310 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 310 may include at least one processor 314 and a system memory 316. By executing the software that implements backup module 50, computing system 310 becomes a special purpose computing device that is configured to cache mapping information while acting as a backup client in an off-host backup system.

Processor 314 generally represents any type or form of processing unit capable of processing data or interpreting and executing instructions. In certain embodiments, processor 314 may receive instructions from a software application or module. These instructions may cause processor 314 to perform the functions of one or more of the embodiments described and/or illustrated herein. For example, processor 314 may perform and/or be a means for performing all or some of the operations described herein. Processor 314 may also perform and/or be a means for performing any other operations, methods, or processes described and/or illustrated herein.

System memory 316 generally represents any type or form of volatile or non-volatile storage device or medium capable of storing data and/or other computer-readable instructions. Examples of system memory 316 include, without limitation, random access memory (RAM), read only memory (ROM), flash memory, or any other suitable memory device. Although not required, in certain embodiments computing system 310 may include both a volatile memory unit (such as, for example, system memory 316) and a non-volatile storage device. In one example, a backup module 50 may be loaded into system memory 316. System memory 316 can also store mapping information generated by such a backup module.

In certain embodiments, computing system 310 may also include one or more components or elements in addition to processor 314 and system memory 316. For example, as illustrated in FIG. 3, computing system 310 may include a memory controller 318, an Input/Output (I/O) controller 320, and a communication interface 322, each of which may be interconnected via a communication infrastructure 312. Communication infrastructure 312 generally represents any type or form of infrastructure capable of facilitating communication between one or more components of a computing device. Examples of communication infrastructure 312 include, without limitation, a communication bus (such as an Industry Standard Architecture (ISA), Peripheral Component Interconnect (PCI), PCI express (PCIe), or similar bus) and a network.

Memory controller 318 generally represents any type or form of device capable of handling memory or data or controlling communication between one or more components of computing system 310. For example, in certain embodiments memory controller 318 may control communication between processor 314, system memory 316, and I/O controller 320 via communication infrastructure 312. In certain embodiments, memory controller 318 may perform and/or be a means for performing, either alone or in combination with other elements, one or more of the operations or features described and/or illustrated herein.

I/O controller 320 generally represents any type or form of module capable of coordinating and/or controlling the input and output functions of a computing device. For example, in certain embodiments I/O controller 320 may control or facilitate transfer of data between one or more elements of computing system 310, such as processor 314, system memory 316, communication interface 322, display adapter 326, input interface 330, and storage interface 334.

Communication interface 322 broadly represents any type or form of communication device or adapter capable of facilitating communication between computing system 310 and one or more additional devices. For example, in certain embodiments communication interface 322 may facilitate communication between computing system 310 and a private or public network including additional computing systems. Examples of communication interface 322 include, without limitation, a wired network interface (such as a network interface card), a wireless network interface (such as a wireless network interface card), a modem, and any other suitable interface. In at least one embodiment, communication interface 322 may provide a direct connection to a remote server via a direct link to a network, such as the Internet. Communication interface 322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 322 may also represent a host adapter configured to facilitate communication between computing system 310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like.

Communication interface 322 may also allow computing system 310 to engage in distributed or remote computing. For example, communication interface 322 may receive instructions from a remote device or send instructions to a remote device for execution.

As illustrated in FIG. 3, computing system 310 may also include at least one display device 324 coupled to communication infrastructure 312 via a display adapter 326. Display device 324 generally represents any type or form of device capable of visually displaying information forwarded by display adapter 326. Similarly, display adapter 326 generally represents any type or form of device configured to forward graphics, text, and other data from communication infrastructure 312 (or from a frame buffer, as known in the art) for display on display device 324.

As illustrated in FIG. 3, computing system 310 may also include at least one input device 328 coupled to communication infrastructure 312 via an input interface 330. Input device 328 generally represents any type or form of input device capable of providing input, either computer or human generated, to computing system 310. Examples of input device 328 include, without limitation, a keyboard, a pointing device, a speech recognition device, or any other input device.

As illustrated in FIG. 3, computing system 310 may also include a primary storage device 332 and a backup storage device 333 coupled to communication infrastructure 312 via a storage interface 334. Storage devices 332 and 333 generally represent any type or form of storage device or medium capable of storing data and/or other computer-readable instructions. For example, storage devices 332 and 333 may each include a magnetic disk drive (e.g., a so-called hard drive), a floppy disk drive, a magnetic tape drive, an optical disk drive, a flash drive, or the like. Storage interface 334 generally represents any type or form of interface or device for transferring data between storage devices 332 and 333 and other components of computing system 310. A storage device like primary storage device 332 can store information such as client data 90 of FIG. 1, as described above.

In certain embodiments, storage devices 332 and 333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 332 and 333 may also include other similar structures or devices for allowing computer software, data, or other computer-readable instructions to be loaded into computing system 310. For example, storage devices 332 and 333 may be configured to read and write software, data, or other computer-readable information. Storage devices 332 and 333 may also be a part of computing system 310 or may be a separate device accessed through other interface systems.

Many other devices or subsystems may be connected to computing system 310. Conversely, all of the components and devices illustrated in FIG. 3 need not be present to practice the embodiments described and/or illustrated herein. The devices and subsystems referenced above may also be interconnected in different ways from that shown in FIG. 3.

Computing system 310 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 310 for storage in memory via a network such as the Internet or upon a carrier medium.

The computer-readable medium containing the computer program may be loaded into computing system 310. All or a portion of the computer program stored on the computer-readable medium may then be stored in system memory 316 and/or various portions of storage devices 332 and 333. When executed by processor 314, a computer program loaded into computing system 310 may cause processor 314 to perform and/or be a means for performing the functions of one or more of the embodiments described and/or illustrated herein. Additionally or alternatively, one or more of the embodiments described and/or illustrated herein may be implemented in firmware and/or hardware. For example, computing system 310 may be configured as an application specific integrated circuit (ASIC) adapted to implement one or more of the embodiments disclosed herein.

Figure 4:
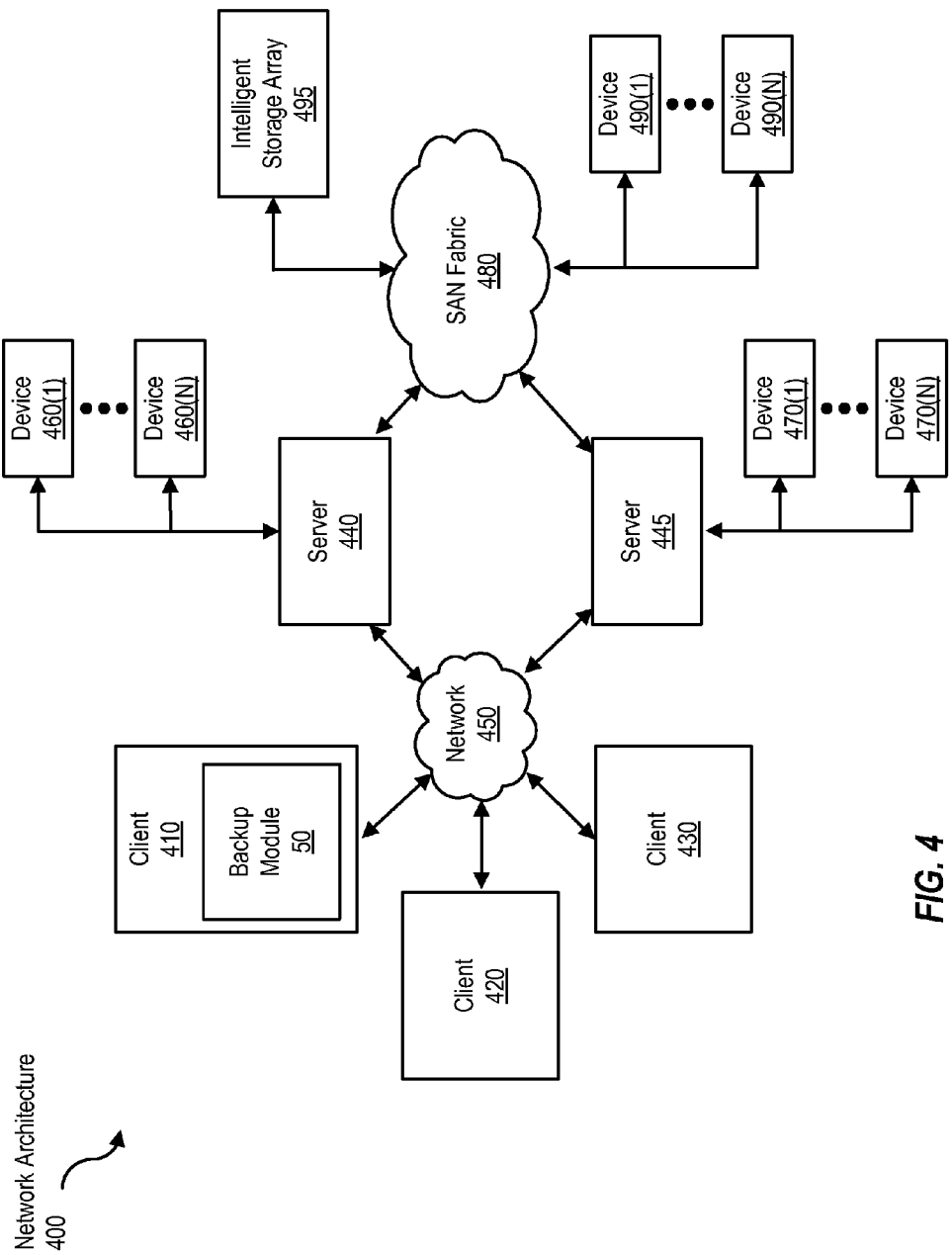
FIG. 4 is a block diagram of a networked system, illustrating how various computing devices can communicate via a network, according to one embodiment of the present invention.

FIG. 4 is a block diagram of a network architecture 400 in which client systems 410, 420, and 430 and servers 440 and 445 may be coupled to a network 450. Client systems 410, 420, and 430 generally represent any type or form of computing device or system, such as computing system 310 in FIG. 3, that can act as a backup client.

Similarly, servers 440 and 445 generally represent computing devices or systems, such as backup servers, media servers, or the like, configured to provide various backup services. Network 450 generally represents any telecommunication or computer network including, for example, an intranet, a wide area network (WAN), a local area network (LAN), a personal area network (PAN), or the Internet. In one example, client systems 410, 420, and/or 430 and/or servers 440 and/or 445 may include backup module 50 as shown in FIGS. 1 and 3.

As illustrated in FIG. 4, one or more storage devices 460(1)-(N) may be directly attached to server 440. Similarly, one or more storage devices 470(1)-(N) may be directly attached to server 445. Storage devices 460(1)-(N) and storage devices 470(1)-(N) generally represent any type or form of storage device or medium capable of storing data and/or other computer-readable instructions. In certain embodiments, storage devices 460(1)-(N) and storage devices 470(1)-(N) may represent network-attached storage (NAS) devices configured to communicate with servers 440 and 445 using various protocols, such as Network File System (NFS), Server Message Block (SMB), or Common Internet File System (CIFS).

Servers 440 and 445 may also be connected to a storage area network (SAN) fabric 480. SAN fabric 480 generally represents any type or form of computer network or architecture capable of facilitating communication between multiple storage devices. SAN fabric 480 may facilitate communication between servers 440 and 445 and a plurality of storage devices 490(1)-(N) and/or an intelligent storage array 495. SAN fabric 480 may also facilitate, via network 450 and servers 440 and 445, communication between client systems 410, 420, and 430 and storage devices 490(1)-(N) and/or intelligent storage array 495 in such a manner that devices 490(1)-(N) and array 495 appear as locally attached devices to client systems 410, 420, and 430. As with storage devices 460(1)-(N) and storage devices 470(1)-(N), storage devices 490(1)-(N) and intelligent storage array 495 generally represent any type or form of storage device or medium capable of storing data and/or other computer-readable instructions.

In certain embodiments, and with reference to computing system 310 of FIG. 3, a communication interface, such as communication interface 322 in FIG. 3, may be used to provide connectivity between each client system 410, 420, and 430 and network 450. Client systems 410, 420, and 430 may be able to access information on server 440 or 445 using, for example, a web browser or other client software. Such software may allow client systems 410, 420, and 430 to access data hosted by server 440, server 445, storage devices 460(1)-(N), storage devices 470(1)-(N), storage devices 490(1)-(N), or intelligent storage array 495. Although FIG. 4 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 440, server 445, storage devices 460(1)-(N), storage devices 470(1)-(N), storage devices 490(1)-(N), intelligent storage array 495, or any combination thereof. All or a portion of one or more of the embodiments disclosed herein may also be encoded as a computer program, stored in server 440, run by server 445, and distributed to client systems 410, 420, and 430 over network 450.

In some examples, all or a portion of the computing devices in FIGS. 1, 3, and 4 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a backup module 50 in FIG. 1 may transform the mapping information for a particular block or extent based upon whether that block or extent has been modified since the last time the mapping information was calculated.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting that a first set of one or more blocks of client data has not been relocated subsequent to a prior off-host backup operation, wherein
      the detecting is performed in response to a request to perform a new off-host backup operation, and
      the detecting is performed without using recalculated mapping information;
   detecting that a second set of one or more blocks of the client data has been relocated subsequent to the prior off-host backup operation;
   providing a media server with a previously calculated set of mapping information for the first set of one or more blocks, in response to the detecting that the first set of one or more blocks has not been relocated, wherein
      the previously calculated set of mapping information was calculated in response to a request to perform the prior off-host backup operation, and the previously calculated set of mapping information was provided to the media server in conjunction with the prior off-host backup operation;

recalculating mapping information for the second set of one or more blocks, in response to the detecting that the second set of one or more blocks has been relocated; and providing the media server with the recalculated mapping information instead of previously calculated mapping information for the second set of one or more blocks, subsequent to the recalculating.

2. The method of claim 1, wherein the detecting that the first set of one or more blocks has not been relocated comprises accessing file system geometry information associated with data in the first set of one or more blocks.

3. The method of claim 1, wherein the detecting that the first set of one or more blocks has not been relocated comprises obtaining a list of blocks that were modified subsequent to a first snapshot and prior to a second snapshot.

4. The method of claim 1, wherein the providing the media server with the previously calculated set of mapping information comprises sending, to the media server via a network, a pointer to mapping information stored on a shared storage device.

5. The method of claim 1, wherein the media server comprises a third-party copy device.

6. The method of claim 1, further comprising storing the recalculated mapping information in a cache of mapping information, wherein the cache comprises the previously calculated set of mapping information for the first set of one or more blocks.

7. The method of claim 1, wherein the providing the media server with the previously calculated set of mapping information is performed prior to the recalculating.

8. The method of claim 1, wherein
the new off-host backup operation comprises copying the first set of one or more blocks.

9. The method of claim 1, wherein
the previously calculated set of mapping information and the recalculated mapping information are generated by a backup client, and
the backup client is configured to be coupled to the media server.

10. A system comprising:
one or more processors; and
a memory coupled to the one or more processors, the memory storing program instructions executable by the one or more processors to:
detect that a first set of one or more blocks of client data has not been relocated subsequent to a prior off-host backup operation, wherein
detecting that the first set of one or more blocks of client data has not been relocated is performed in response to a request to perform a new off-host backup operation, and
the detecting that the first set of one or more blocks of client data has not been relocated is performed without using recalculated mapping information;
detect that a second set of one or more blocks of the client data has been relocated subsequent to the prior off-host backup operation;
provide a media server with a previously calculated set of mapping information for the first set of one or more blocks, in response to detecting that the first set of one or more blocks has not been relocated, wherein
the previously calculated set of mapping information was calculated in response to a request to perform the prior off-host backup operation, and
the previously calculated set of mapping information was provided to the media server in conjunction with the prior off-host backup operation;
recalculate mapping information for the second set of one or more blocks, in response to detecting that the second set of one or more blocks has been relocated; and
provide the media server with the recalculated mapping information instead of previously calculated mapping information for the second set of one or more blocks, subsequent to recalculating the mapping information for the second set of one or more blocks.

11. The system of claim 10, wherein the program instructions are executable to detect that the first set of one or more blocks has not been relocated by accessing file system geometry information associated with data in the first set of one or more blocks.

12. The system of claim 10, wherein the program instructions are executable to detect that the first set of one or more blocks has not been relocated by obtaining a list of blocks that were modified subsequent to a first snapshot and prior to a second snapshot.

13. The system of claim 10, wherein the program instructions are executable to provide the media server with the previously calculated set of mapping information by sending, to the media server via a network, a pointer to mapping information stored on a shared storage device.

14. The system of claim 10, wherein the media server comprises a third-party copy device.

15. The system of claim 10, wherein the program instructions are executable to store the recalculated mapping information in a cache of mapping information, wherein the cache comprises the previously calculated set of mapping information for the first set of one or more blocks.

16. The system of claim 10, wherein the program instructions are executable to provide the media server with the previously calculated set of mapping information prior to recalculating the mapping information for the second set of blocks.

17. A non-transitory computer readable storage medium comprising program instructions executable by one or more processors to:
detect that a first set of one or more blocks of client data has not been relocated subsequent to a prior off-host backup operation, wherein
detecting that the first set of one or more blocks of client data has not been relocated is performed in response to a request to perform a new off-host backup operation, and
the detecting that the first set of one or more blocks of client data has not been relocated is performed without using recalculated mapping information;
detect that a second set of one or more blocks of the client data has been relocated subsequent to the prior off-host backup operation;
provide a media server with a previously calculated set of mapping information for the first set of one or more blocks, in response to detecting that the first set of one or more blocks has not been relocated, wherein
the previously calculated set of mapping information was calculated in response to a request to perform the prior off-host backup operation, and
the previously calculated set of mapping information was provided to the media server in conjunction with the prior off-host backup operation;
recalculate mapping information for the second set of one or more blocks, in response to detecting that the second set of one or more blocks has been relocated; and provide the media server with the recalculated mapping information instead of previously calculated mapping information for the second set of one or more blocks, subsequent to recalculating the mapping information for the second set of one or more blocks.

18. The non-transitory computer readable storage medium of claim 17, wherein the program instructions are executable to detect that the first set of one or more blocks has not been relocated by accessing file system geometry information associated with data in the first set of one or more blocks.

19. The non-transitory computer readable storage medium of claim 17, wherein the program instructions are executable to detect that the first set of one or more blocks has not been relocated by obtaining a list of blocks that were modified subsequent to a first snapshot and prior to a second snapshot.

20. The non-transitory computer readable storage medium of claim 17, wherein the program instructions are executable to provide the media server with the previously calculated set of mapping information by sending, to the media server via a network, a pointer to mapping information stored on a shared storage device.

21. The non-transitory computer readable storage medium of claim 17, wherein the program instructions are executable to store the recalculated mapping information in a cache of mapping information, wherein the cache comprises the previously calculated set of mapping information for the first set of one or more blocks.

22. The non-transitory computer readable storage medium of claim 17, wherein the program instructions are executable to provide the media server with the previously calculated set of mapping information prior to recalculating the mapping information for the second set of blocks.

* * * * *